United States Patent
Owen et al.

(10) Patent No.: US 12,547,637 B2
(45) Date of Patent: Feb. 10, 2026

(54) CREATING DATA WAREHOUSE VIEWS FOR INPUT TABLES

(71) Applicant: SIGMA COMPUTING, INC., San Francisco, CA (US)

(72) Inventors: Gregory G. Owen, San Mateo, CA (US); Stipo Josipovic, San Francisco, CA (US); Ian Gardner, San Francisco, CA (US); James L Gale, San Francisco, CA (US); Kang-Hua Wu, Mountain View, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 126 days.

(21) Appl. No.: 18/307,272

(22) Filed: Apr. 26, 2023

(65) Prior Publication Data

US 2024/0362245 A1   Oct. 31, 2024

(51) Int. Cl.
*G06F 16/25* (2019.01)
*G06F 16/28* (2019.01)

(52) U.S. Cl.
CPC .......... *G06F 16/254* (2019.01); *G06F 16/283* (2019.01)

(58) Field of Classification Search
None
See application file for complete search history.

(56) References Cited

U.S. PATENT DOCUMENTS

2020/0301926 A1   9/2020   Frantz et al.
2023/0401225 A1*  12/2023  Shah .................. G06F 11/3006

OTHER PUBLICATIONS

Richardson, Ben, "Understanding the SQL EXCEPT statement with examples", published Dec. 23, 2019, available at: www.SQLShack.com/Understanding-the-SQL-EXCEPT-statement-with-examples/, 8 pages. (Year: 2019).*
Dageville, Benoit, et al., "The Snowflake Elastic Data Warehouse", ACM 2016 SIGMOD/PODS, pp. 215-226. (Year: 2016).*
Cyran et al., "Oracle Database Concepts, 10g Release 2 (10.2)," https://docs.oracle.com/cd//B19306_01/server.102/b14220/title.htm, Oct. 1, 2005, pp. 1-66.
Gale et al., "Sigma Worksheet: Interactive Construction of OLAP Queries," ARXIV.org, Corneall University Library, May 6, 2021, 15 pages.
International Search Report and Written Opinion, PCT/US2024/025615, Jul. 25, 2024, 11 pages.

* cited by examiner

*Primary Examiner* — Scott A. Waldron

(57) ABSTRACT

Creating data warehouse views for input tables including: selecting, by a workbook manager, a subset of columns of an input table stored in a cloud-based data warehouse, wherein the subset of columns excludes one or more metadata columns of the input table; generating, by the workbook manager, a view of the input table based on the subset of columns; and storing, by the workbook manager, the view of the input table in the cloud-based data warehouse.

17 Claims, 6 Drawing Sheets

CREATING DATA WAREHOUSE VIEWS FOR INPUT TABLES

BACKGROUND

Field of the Invention

The field of the invention is data processing, or, more specifically, methods, apparatus, and products for creating data warehouse views for input tables.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for creating data warehouse views for input tables including selecting, by a workbook manager, a subset of columns of an input table stored in a cloud-based data warehouse, wherein the subset of columns excludes one or more metadata columns of the input table; generating, by the workbook manager, a view of the input table based on the subset of columns; and storing, by the workbook manager, the view of the input table in the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
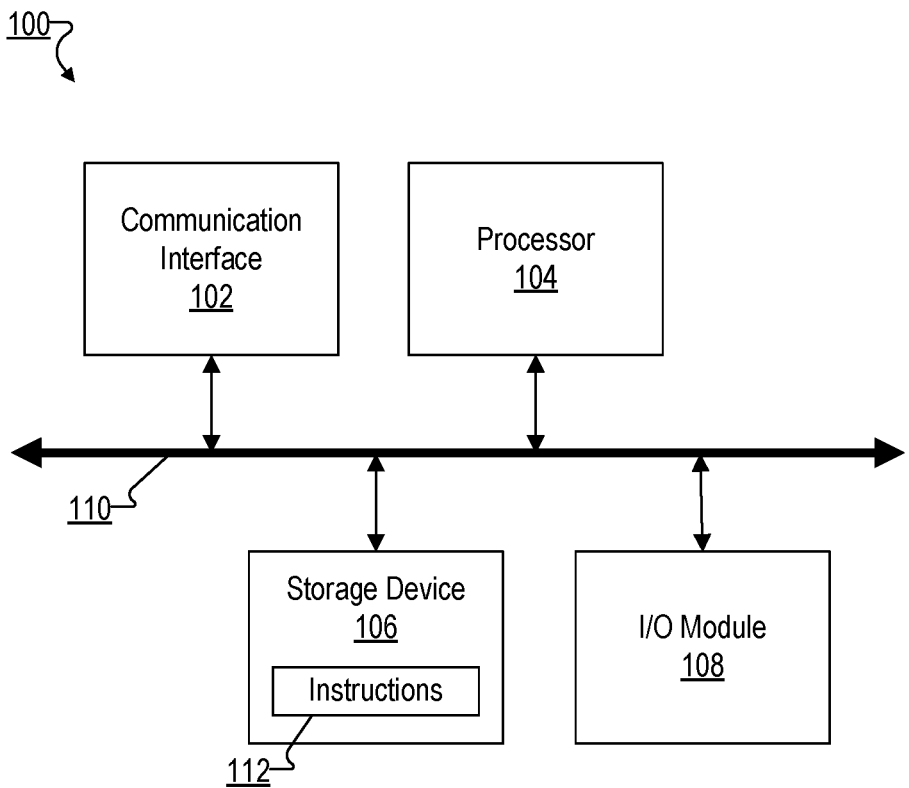
FIG. 1 sets forth a block diagram of an example system configured for creating data warehouse views for input tables according to embodiments of the present invention.

Example methods, apparatus, and products for creating data warehouse views for input tables in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
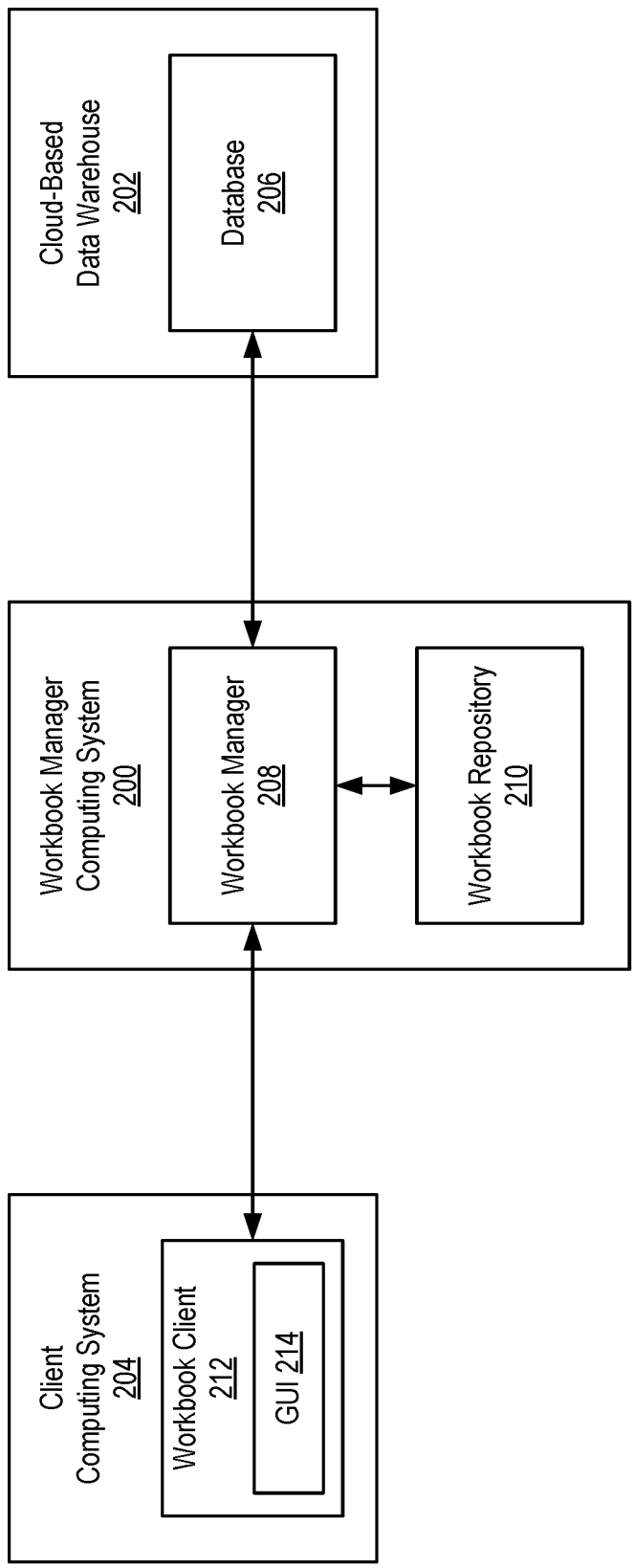
FIG. 2 sets forth a block diagram of an example system configured for creating data warehouse views for input tables according to embodiments of the present invention.

For further explanation, FIG. 2 illustrates a block diagram depicting an exemplary system for creating data warehouse views for input tables according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a client. The workbook manager 208 may reside on the workbook manager computing system 200, which is an intermediary computing system between each client computing system and the cloud-based data warehouse 202.

The cloud-based data warehouse 202 stores and manages client data on behalf of the client. The client (e.g., via the client computing system 204) accesses the data via the workbook manager 208, which organizes and analyzes the data as datasets within a workbook. The workbook manager 208 may access the client data from the cloud-based data warehouse 202 using credentials supplied by the client.

A workbook is a presentation of data from a cloud-based data warehouse 202 (e.g., using one or workbook elements). To present data from the cloud-based data warehouse 202, the data is retrieved from the database 206 (e.g., using a database statement) and organized using a dataset. A dataset is a collection of information that resides on the workbook manager computing system 200 that includes instructions for the retrieval and organization of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse. A workbook may include one or more workbook elements. Each workbook element includes a collection of graphical elements and organizing mechanism for a dataset or portion of a dataset. Workbooks may be stored in the workbook repository 210. Workbooks are described in further detail below.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212a, 212b may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
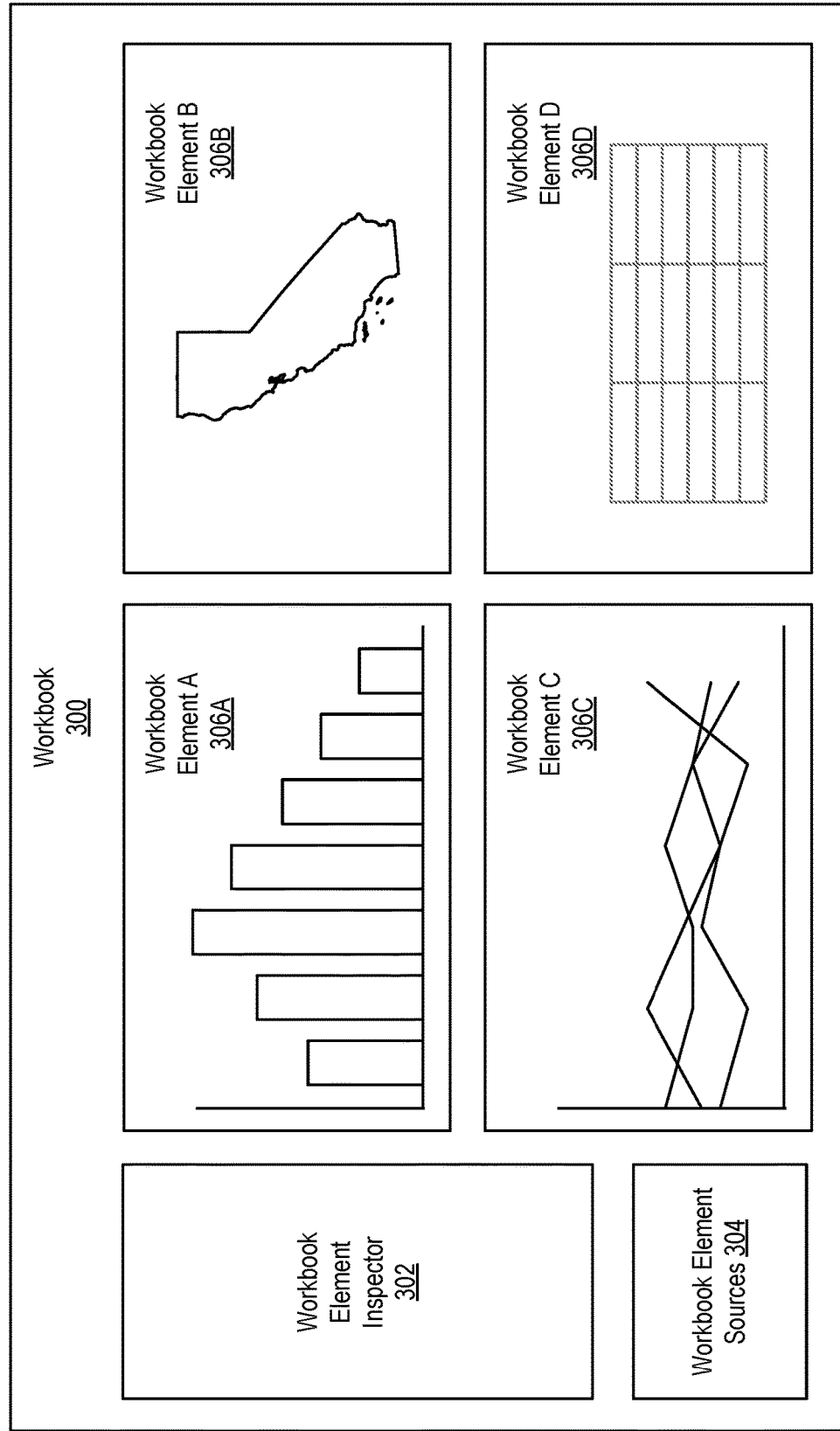
FIG. 3 sets forth a block diagram of an example system configured for creating data warehouse views for input tables according to embodiments of the present invention.

FIG. 3 shows an exemplary GUI for creating data warehouse views for input tables according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical elements that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of the of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
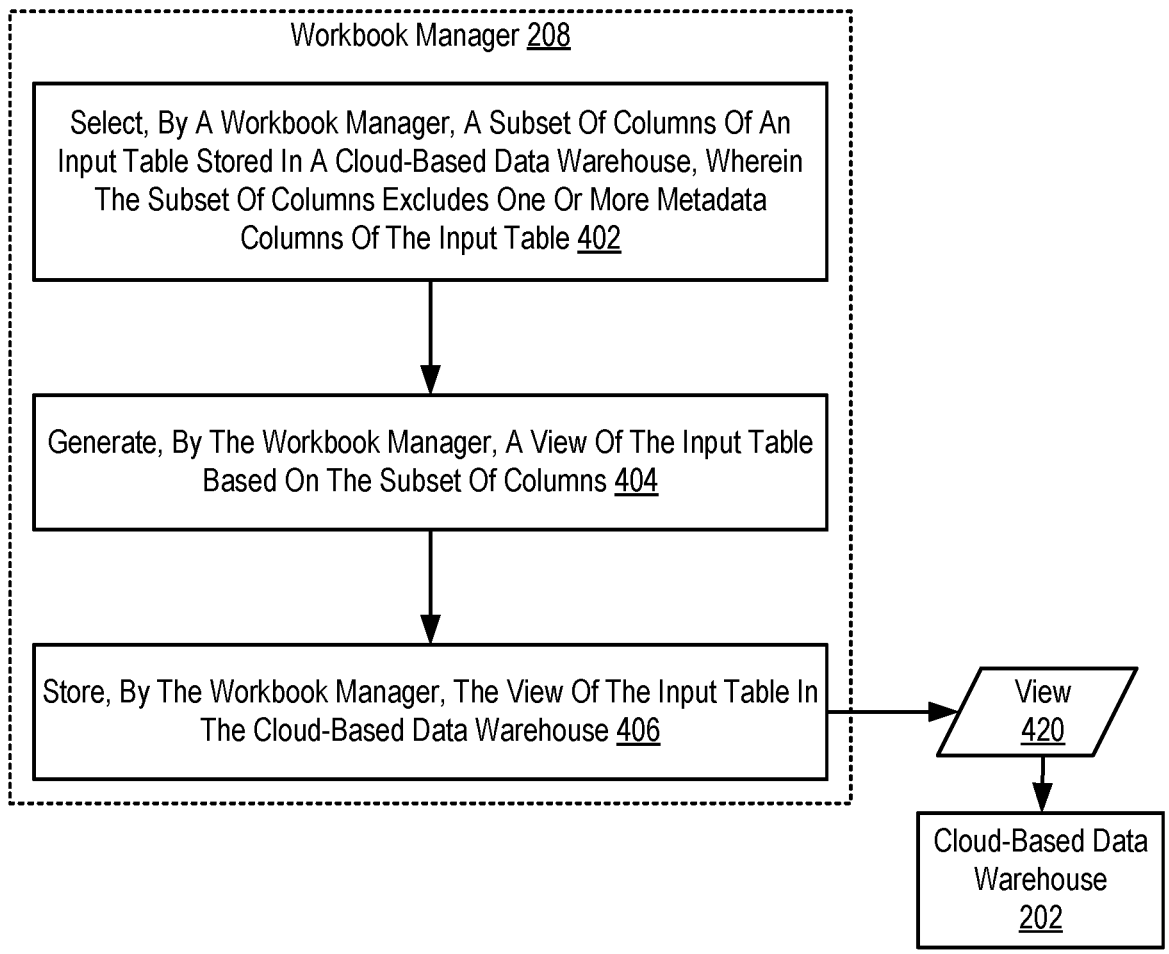
FIG. 4 sets forth a flow chart illustrating an exemplary method for creating data warehouse views for input tables according to embodiments of the present invention.

For further explanation, FIG. 4 sets forth a flow chart illustrating an exemplary method for creating data warehouse views for input tables according to embodiments of the present invention. The method of FIG. 4 includes selecting 402, by a workbook manager 208, a subset of columns of an input table stored in a cloud-based data warehouse 202, wherein the subset of columns excludes one or more metadata columns of the input table. The input table may be a table on the cloud-based data warehouse 202 created by a user of the workbook manager 208, such as a user of a client computing system 204. The input table may be generated automatically by the workbook manager 208 in response to input from the user of the client computing system 204. The input table is stored in the cloud-based data warehouse 202 and editable via the workbook manager 208. For example, a spreadsheet structure of a workbook may be used to view and edit the input table via the workbook manager 208. The input table allows for creation of a user input table that may be used to interact with or perform various analytics related to other tables on the cloud-based data warehouse 202, such as tables of data aggregated from various other data sources. In some embodiments, the input table may be created as an empty input table that is blank on creation (e.g., starting with no defined values for any cells). In some embodiments, the input table may be created as a linked input table that is generated or sourced based on some other data in the cloud-based data warehouse 202.

The input table may be editable via a workbook 208. In order to edit the input table, the workbook 208 may display a presentation of the input table via a workbook element such as a spreadsheet structure. Thus, a user may add or remove columns and/or rows to or from the input table via the workbook 208, or edit particular cells of the input table via the workbook. In addition to the columns of the input table presented via the workbook, the input table may also include one or more other columns that are not presented via the workbook.

As an example, the input table may include one or more metadata columns. These metadata columns may store metadata related to their respective records. For example, where the input table includes a linked input table, these metadata columns may be used to link particular records in the input table to other tables in the cloud-based data warehouse 202. Such metadata columns may be used, for example, in presenting particular workbook elements, performing particular data analytics or transformations with respect to other tables stored in the cloud-based data warehouse 202, or updating the input table based on changes to other tables in the cloud-based data warehouse 202 linked to the input table. In some embodiments, the one or more metadata columns may be included in the input table upon creation of the input table. In some embodiments, the one or more metadata columns may be added or modified as the input table is modified, or as tables linked to the input table are modified.

As is set forth above, the one or more selected columns of the input table may exclude one or more of the metadata columns. In some embodiments, the one or more selected columns of the input table may exclude each of the metadata columns of the input table. In some embodiments, the one or more selected columns may correspond to a presentation of the input table via a workbook. In other words, the one or more selected columns may include those columns of the input table presented via the workbook and excluding the metadata columns not presented via the workbook. In embodiments where the input table includes columns other than metadata columns that are not presented via the workbook, the one or more selected columns may exclude those other columns of the input table via the workbook.

The subset of columns may be selected based on characteristics of the columns. For example, the metadata columns may include some characteristic lacking in the columns intended for presentation. Consequently, columns that include that characteristic may be excluded from the subset. As a specific example, the name of the column may include one or more special characters that indicate that the column is a metadata column. The workbook manager 208 may select only those columns with names that exclude the special character.

The method of FIG. 4 also includes generating 404, by the workbook manager 208, a view 420 of the input table based on the subset of columns. The view 420 of the input table is a queryable subset of the input table that includes the selected subset of columns and excludes other, non-selected columns of the input table. The view 420 of the input table is queryable in that database statements (e.g., structured query language (SQL) statements or other database statements) may be directed to the view 420 similar to a database table. A response to the query issued to the view 420 will be based on the subset of the input table included in the view 420 (e.g., the selected one or more columns).

The view 420 may be encoded as a file that indicates the selected subset of the input table. For example, in some embodiments, the view 420 may be encoded as a file storing a database statement that selects or otherwise identifies, from the input table, the selected subset. The view 420 of the input table may include a name or identifier to allow queries to be directed to the view 420. In some embodiments, the name of the view 420 may be automatically generated. For example, in some embodiments, the name of the view 420 may be generated randomly or based on some rule set or naming convention. In some embodiments, the name of the view 420 may include a user-defined name. In some embodiments, the file encoding the view 420 may include a file name matching or based on the name of the view 420.

The method of FIG. 4 also includes storing 406, by the workbook manager, the view 420 of the input table in the cloud-based data warehouse 202. For example, the workbook manager 208 may provide, to the cloud-based data warehouse 202, the file encoding the view 420. By storing 406 the view 420 of the input table in the cloud-based data warehouse 202, database statements directed to the view 420 may be provided to the cloud-based data warehouse 202. Storing 406 the view 420 of the input table in the cloud-based data warehouse 202 allows for database statements related to the input table to be processed without the need to account for or consider non-presented columns of the input table such as metadata columns. Particularly, the view 420 allows for database statements related to the input table from sources other than the workbook manager 208 to be processed.

Consider an example where a user has created an input table via the workbook manager 208 and the user wishes to access the data presented via the input table through a software application other than the workbook manager 208. Without the view, responses to queries to the input table may include data from the metadata columns unless explicitly excluded in the queries. For example, in order to exclude data from these metadata columns, such queries may need to explicitly select only those columns included in the presentation of the input table. This places an additional burden on the user to create more complicated database statements to account for the metadata columns. Instead, the user may issue queries to the view 420 without the need to explicitly exclude or otherwise account for the metadata columns in the input table, allowing for the user to create more simple queries to access the required data.

As another example, consider an example where a user wishes to use software to access the data presented via the input table but cannot create their own custom queries. For example, the software may only select entire tables from a database as opposed to a selectable subset of the table. In this example, accessing the input table directly would necessarily access the metadata columns or other non-presented columns. This results in less useful data for the user, and also increases the overall amount of data accessed from the cloud-based data warehouse 202. By accessing the generated view 420, the amount of data accessed from the cloud-based data warehouse 202 is reduced and the quality of the accessed data is increased by virtue of excluding the metadata columns or other non-presented columns.

In some embodiments, the approaches described above for generating 404 a view 420 for an input table and storing 406 the view 420 in the cloud-based data warehouse 202 may be automatically performed. For example, in some embodiments, a view 420 of an input table may be generated 404 and stored 406 in the cloud-based data warehouse 202 in response to creation of the input table. In some embodiments, as will be described in further detail below, a view 420 of an input table may be generated 404 and stored 406 in the cloud-based data warehouse 202 in response to a request to generate 404 the view 420 from a user.

Figure 5:
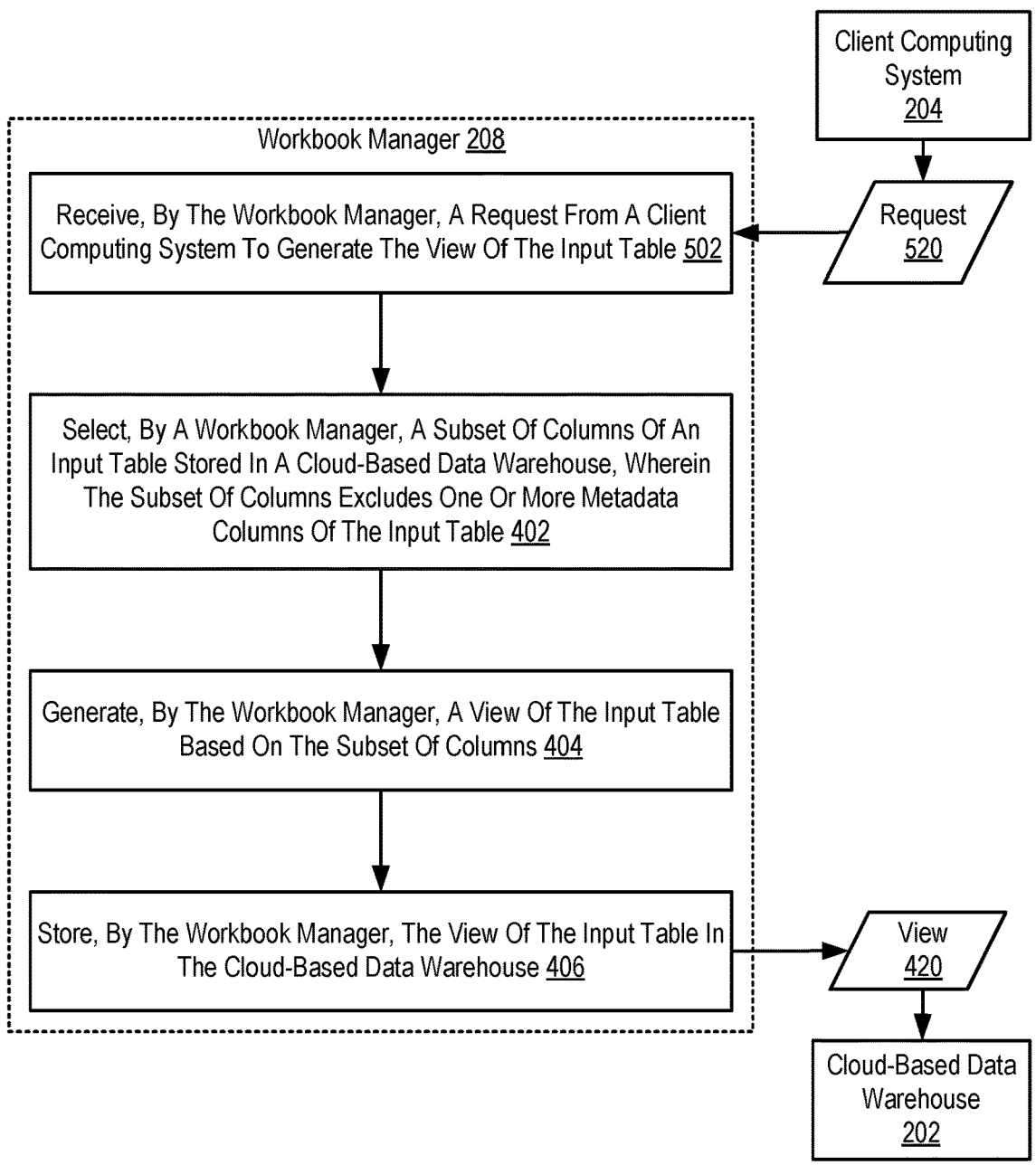
FIG. 5 sets forth a flow chart illustrating an exemplary method for creating data warehouse views for input tables according to embodiments of the present invention.

For further explanation, FIG. 5 sets forth a flow chart illustrating a further exemplary method for creating data warehouse views for input tables according to embodiments of the present invention that includes: selecting 402, by a workbook manager 208, a subset of columns of an input table stored in a cloud-based data warehouse 202, wherein the subset of columns excludes one or more metadata columns of the input table; generating 404, by the workbook manager 208, a view of the input table based on the subset of columns; and storing 406, by the workbook manager 208, the view of the input table in the cloud-based data warehouse 202.

The method of FIG. 5 differs from the method of FIG. 4, however, in that the method of FIG. 5 further includes receiving 502, by the workbook manager, a request 520 from a client computing system 204 to generate the view 420 of the input table. The request 520 may be received 502 from a user of the client computing system 204 that created the input table, has sufficient access or permissions to modify the input table, or has sufficient access or permissions to cause a view 420 for the input table to be generated 404 and stored 406 in the cloud-based data warehouse 202. Receiving 502 the request 520 causes the view 420 for the input table to be generated 404 and stored 406 in the cloud-based data warehouse 202.

In some embodiments, the request 520 may be received 502 as part of a workflow or process for creating the input table. For example, in response to or during creation of the input table, the workbook manager 208 may solicit the user for an indication for whether a view 420 for the input table should be generated 404. An indication from the user that the view 420 should be generated 404 may cause the request 520 to be provided to the workbook manager 208, thereby causing the view 420 to be generated 404. In some embodiments, a menu item or command of the workbook 208 may be selected indicating that the view 420 should be generated 404. Selection of such a menu item or command may cause the request 520 to be provided to the workbook manager 208, thereby causing the view 420 to be generated 404. This allows for views 420 to only be selectively generated 404 and stored 406 for input tables as specifically requested by a user.

Figure 6:
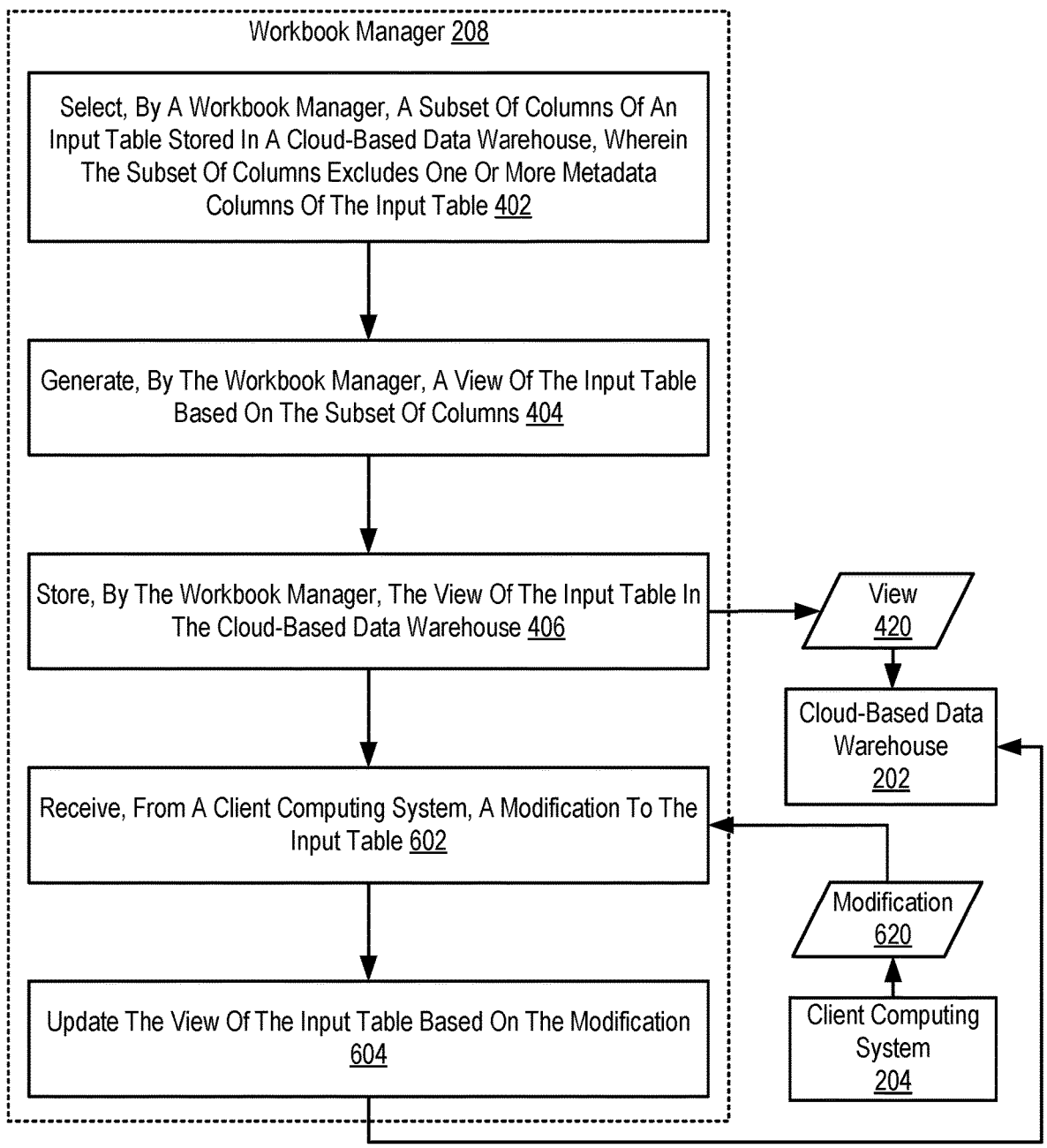
FIG. 6 sets forth a flow chart illustrating an exemplary method for creating data warehouse views for input tables according to embodiments of the present invention.

For further explanation, FIG. 6 sets forth a flow chart illustrating a further exemplary method for creating data warehouse views for input tables according to embodiments of the present invention that includes selecting 402, by a workbook manager 208, a subset of columns of an input table stored in a cloud-based data warehouse 202, wherein the subset of columns excludes one or more metadata columns of the input table; generating 404, by the workbook manager 208, a view of the input table based on the subset of columns; and storing 406, by the workbook manager 208, the view of the input table in the cloud-based data warehouse 202.

The method of FIG. 6 differs from the method of FIG. 4, however, in that the method of FIG. 6 further includes receiving 602, from a client computing system 204, a modification 620 to the input table. In some embodiments modification 620 to the input table may include any change to the structure, and/or schema of the input table. For example, the modification 620 may include the creation or removal of one or more columns in the input table. In some embodiments, the modification 620 may include a change in which other tables in the cloud-based data warehouse 202 are linked to the input table. In some embodiments, the modification 620 may include a change in database statements or queries directed to other tables in the cloud-based data warehouse 202 in order to generate the data for the input table.

In some embodiments, the modification 620 is received 602 via a workbook presenting the input table on a client computing system 204. For example, a workbook client 212 on the client computing system 204 may present a GUI 214 including a spreadsheet structure or other workbook element for the input table. A modification 620 may be received via the workbook by one or more user interactions with the workbook. For example, a column may be added to or removed from the input table by selection of a particular user interface element such as a button or menu item. As a further example, fields for queries or otherwise defining relationships between the input table and one or more linked tables in the cloud-based data warehouse 202 may be modified. In response to receiving 602 the modification 620, the input table in the cloud-based data warehouse 202 may be updated to reflect the modification 620. Moreover, a presentation of the input table in a workbook (e.g., as presented on the client computing system 204) may be updated to reflect the modification 620.

In some embodiments, the modification 620 may be received as a database statement that, when provided to the cloud-based data warehouse 202, causes the input table to be modified to reflect the modification 620. In some embodiments, the modification 620 may be received as a state specification or other data describing the modification 620 and/or the input table as reflecting the modification 620. In such embodiments, the workbook manager 208 may generate a database statement for the cloud-based data warehouse 202 to modify the input table in the cloud-based data warehouse 202 based on the received modification 620.

The method of FIG. 6 also includes updating 604 the view 420 of the input table based on the modification 620. For example, where the modification 620 changes which columns of the input table are presented via a workbook (e.g., by virtue of adding and/or removing columns), the view 420 may be updated to include or exclude one or more columns depending on the particular changes to the columns of the presented input table. Updating 604 the view 420 of the input table may include regenerating the view 420 to reflect the modification 620 and storing the updated view 420 in the cloud-based data warehouse 202. In some embodiments, updating 604 the view 420 of the input table causes the previously generated view 420 to be overwritten or deleted. In some embodiments, updating 604 the view 420 of the input table causes the previously generated view 420 to be deprecated. For example, in some embodiments, a file name of the previously generated view 420 may be modified such that queries directed to the view 420 are not directed to the previously generated view 420. As another example, in some embodiments, metadata describing views 420 of the input table may be updated or modified to indicate that the previously generated view 420 should not be used.

In some embodiments, updating 604 the view 420 of the input table is performed automatically in response to receiving 602 the modification 620 to the input table. In some embodiments, updating 604 the view of the input table is performed in response to a request or indication that the view 420 should be updated 604. For example, in some embodiments, in response to receiving 602 the modification 620 a workbook may solicit, from a user, an indication of whether the view 420 should be updated 604. As another example, in some embodiments, in response to receiving 602 the modification 620 the workbook may indicate that a current view 420 of the input table does not reflect the input table as modified. A user may then request or indicate that the view 420 should be updated 604.

In view of the explanations set forth above, readers will recognize that the benefits of creating data warehouse views for input tables according to embodiments of the present invention include:

Improving the operation of the computer system by enabling access to input table data without metadata columns or other non-presented data, increasing system utility.

Exemplary embodiments of the present invention are described largely in the context of a fully functional computer system for creating data warehouse views for input tables. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for creating data warehouse views for input tables, the method comprising:
  creating, by a workbook manager, an input table on a cloud-based data warehouse in response to receiving a request, from a client computing system, to create the input table, wherein the input table is created with metadata columns that are not presented on the client computing system, wherein the workbook manager is included within an intermediary computing system between the client computing system and the cloud-based data warehouse;

presenting, by the workbook manager, the input table via a spreadsheet structure within a workbook, wherein the spreadsheet structure within the workbook enables a user of the client computing system to view and edit the input table;

selecting, by the workbook manager, a subset of columns of the input table stored in the cloud-based data warehouse, wherein the subset of columns excludes one or more of the metadata columns of the input table;

generating, by the workbook manager, a view of the input table based on the subset of columns; and storing, by the workbook manager, the view of the input table in the cloud-based data warehouse accessible by a software application external to the workbook manager, wherein the one or more of the metadata columns are inaccessible by the software application via the view of the input table.

2. The method of claim 1, wherein the subset of columns corresponds to a presentation of the input table in the workbook.

3. The method of claim 1, further comprising receiving, by the workbook manager, a request from the client computing system to generate the view of the input table.

4. The method of claim 1, further comprising:
receiving, from the client computing system, a modification to the input table; and
updating the view of the input table based on the modification.

5. The method of claim 4, wherein the modification is received via the workbook presenting the input table.

6. The method of claim 1, wherein the one or more of the metadata columns comprise one or more metadata columns generated during creation of the input table.

7. An apparatus for creating data warehouse views for input tables, the apparatus comprising a computer processor, a computer memory operatively coupled to the computer processor, the computer memory having disposed within it computer program instructions that, when executed by the computer processor, cause the apparatus to carry out the steps of:

creating, by a workbook manager, an input table on a cloud-based data warehouse in response to receiving a request, from a client computing system, to create the input table, wherein the input table is created with metadata columns that are not presented on the client computing system, wherein the workbook manager is included within an intermediary computing system between the client computing system and the cloud-based data warehouse;

presenting, by the workbook manager, the input table via a spreadsheet structure within a workbook, wherein the spreadsheet structure within the workbook enables a user of the client computing system to view and edit the input table;

selecting, by the workbook manager, a subset of columns of the input table stored in the cloud-based data warehouse, wherein the subset of columns excludes one or more of the metadata columns of the input table;

generating, by the workbook manager, a view of the input table based on the subset of columns; and storing, by the workbook manager, the view of the input table in the cloud-based data warehouse accessible by a software application external to the workbook manager, wherein the one or more of the metadata columns are inaccessible by the software application via the view of the input table.

8. The apparatus of claim 7, wherein the subset of columns corresponds to a presentation of the input table in the workbook.

9. The apparatus of claim 7, wherein the computer program instructions further cause the apparatus to carry out the step of receiving, by the workbook manager, a request from the client computing system to generate the view of the input table.

10. The apparatus of claim 7, wherein the computer program instructions further cause the apparatus to carry out the steps of:
receiving, from the client computing system, a modification to the input table; and
updating the view of the input table based on the modification.

11. The apparatus of claim 10, wherein the modification is received via the workbook presenting the input table.

12. The apparatus of claim 7, wherein the one or more of the metadata columns comprise one or more metadata columns generated during creation of the input table.

13. A computer program product for creating data warehouse views for input tables, the computer program product disposed upon a computer readable medium, the computer program product comprising computer program instructions that, when executed, cause a computer to carry out the steps of:

creating, by a workbook manager, an input table on a cloud-based data warehouse in response to receiving a request, from a client computing system, to create the input table, wherein the input table is created with metadata columns that are not presented on the client computing system, wherein the workbook manager is included within an intermediary computing system between the client computing system and the cloud-based data warehouse;

presenting, by the workbook manager, the input table via a spreadsheet structure within a workbook, wherein the spreadsheet structure within the workbook enables a user of the client computing system to view and edit the input table;

selecting, by the workbook manager, a subset of columns of the input table stored in the cloud-based data warehouse, wherein the subset of columns excludes one or more of the metadata columns of the input table;

generating, by the workbook manager, a view of the input table based on the subset of columns; and storing, by the workbook manager, the view of the input table in the cloud-based data warehouse accessible by a software application external to the workbook manager, wherein the one or more of the metadata columns are inaccessible by the software application via the view of the input table.

14. The computer program product of claim 13, wherein the subset of columns corresponds to a presentation of the input table in the workbook.

15. The computer program product of claim 13, wherein the computer program instructions further cause the computer to carry out the step of receiving, by the workbook manager, a request from the client computing system to generate the view of the input table.

16. The computer program product of claim 13, wherein the computer program instructions further cause the computer to carry out the steps of:
- receiving, from the client computing system, a modification to the input table; and
- updating the view of the input table based on the modification.

17. The computer program product of claim 16, wherein the modification is received via the workbook presenting the input table.

* * * * *